Figure 2:
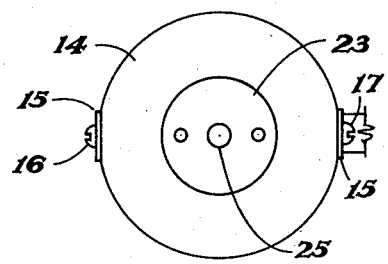

Jan. 23, 1951  P. P. REICHERTZ  2,539,355
APPARATUS FOR MEASURING INTERSTITIAL WATER
CONTENT, PERMEABILITY, AND ELECTRICAL
CONDUCTIVITY OF WELL CORES

Filed Aug. 6, 1947  2 Sheets-Sheet 1

INVENTOR.
Paul P. Reichertz
BY
Frederick E. Dumoulin
AGENT

Patented Jan. 23, 1951

2,539,355

UNITED STATES PATENT OFFICE 2,539,355

APPARATUS FOR MEASURING INTERSTITIAL WATER CONTENT, PERMEABILITY, AND ELECTRICAL CONDUCTIVITY OF WELL CORES

Paul P. Reichertz, Dallas, Tex., assignor, by mesne assignments, to Socony-Vacuum Oil Company, Incorporated, New York, N. Y., a corporation of New York Application August 6, 1947, Serial No. 766,566

9 Claims. (Cl. 73—38)

This invention relates to apparatus for measuring characteristics of cores taken from wells such as oil or gas wells, and relates particularly to apparatus for measuring the interstitial water content, the electrical conductivity, and the permeability of such well cores.

In the drilling of oil or gas wells, samples of the strata through which the well is being drilled are taken and various characteristics of the samples, or cores, are determined for the purpose of establishing the lithologic character of the structure, estimating the quantity of oil or gas in the formation, the ease of flow through the strata, etc. Such cores are also taken from producing strata and their characteristics determined for the purpose of estimating reserves, predicting production rates, etc. Among the characteristics of well cores determined for these and other purposes are the quantity of interstitial water, the permeability, and the electrical conductivity.

The interstitial water content of well cores may be measured indirectly by leaching and drying the core and, after saturating with water or brine, placing the core in capillary contact with a semi-permeable membrane and subjecting to a pressure of a phase immiscible with the liquid employed for saturating the core. The water is expelled from the core through the semi-permeable membrane as a result of capillary forces created by the application of the externally applied pressure and when the water content of the core arrives at a minimum and no longer decreases with increasing pressure, the quantity of water contained therein is regarded as the minimum interstitial water content or the interstitial water content of the core as it existed in the underground formation. For estimating this minimum quantity of water and for determining when the minimum quantity has been attained, weighing of the core has been employed. This, however, necessitates removal of the core from the pressure imposing apparatus and, since attainment of the minimum quantity of water is a slow process, sometimes taking as long as thirty days, a large number of weighings are required. Weighings are tedious and time-consuming and, in addition, it cannot be presumed that, after removal of the core from the pressure imposing apparatus with consequent change in pressure, the core will attain the same state of equilibrium after being returned to the apparatus. Further, permeabilities of cores vary with their interstitial water contents. Thus, where it is desired to measure the permeability of the core at the minimum interstitial water content or at an intermediate interstitial water content, removal of the core from the pressure imposing apparatus may disturb the interstitial water content, as by evaporation or otherwise, with consequent error in determination of permeability.

It is an object of this invention to provide an apparatus for the measurement of interstitial water content of well cores. It is another object of this invention to provide an apparatus for the measurement of interstitial water content of well cores whereby the attainment of the minimum water content or any intermediate water content may be determined without removal of the well core from the apparatus and without interruption of pressure. It is another object of this invention to provide an apparatus whereby permeability of well cores having minimum quantities of interstitial water or any intermediate quantity of interstitial water may be determined. It is another object of this invention to provide an apparatus whereby interstitial water content and permeability of well cores may be determined without removal of the well core from the apparatus. It is another object of this invention to provide an apparatus whereby electrical conductivity of well cores may be determined simultaneously with determination of interstitial water or permeability. These and other objects of this invention will become apparent from the following description thereof.

In the apparatus of the invention, a well core, after leaching and saturating and having been covered along its outer surface with an impervious coating so as to seal off the sides and leave exposed two plane surfaces substantially normal to the impervious coating, is placed in capillary contact at one of the exposed surfaces with a semi-permeable membrane, subjected to a desired pressure, and the water removed under the influence of the pressure from the core and passing through the semi-permeable membrane measured volumetrically. Attainment of the minimum quantity of water is readily determined by noting when the volume of water removed from the core no longer increases. Further, the minimum interstitial water content, and any water content intermediate to saturation and the minimum content, is readily calculated knowing the volume of water in the core at saturation. Electrical conductivity of the core is measured at any time by means of properly situated electrical contacts or conductors. The apparatus also makes possible the measurement of permeability at the minimum interstitial water content or at any intermediate interstitial water content without disturbance of the core. This is accomplished by breaking the capillary contact of the core with the semi-permeable membrane, imposing a pressure of a phase immiscible with that employed for saturating the core at one exposed surface of the core, and measuring the rate of flow of this phase issuing from the other exposed surface. By employing the same mean pressure for the determination of permeability as for the determination of interstitial water content, permeability may be measured without substantial disturbance of any equilibria established in the core, and, where permeability is measured at an interstitial water content intermediate to the minimum content, the determination of another interstitial water content may be continued after the determination of permeability.

For measurement of the characteristic of well cores, it is customary to use as large a sample as is practicable in order to obtain a sufficiently accurate determination by reducing errors encountered in measuring small quantities. Further, it is customary to cut the core into a well defined geometrical shape, as, for example, into a cylinder, for purposes of easy handling, accommodation in the measuring apparatus, and, in the case of permeability measurements, in order to provide a known and uniform cross sectional area. Cores cut into cylinders having lengths from about one and one-half to about three inches and diameters from about one-half to one inch are satisfactory.

For carrying out the measurements on the core sample, the core is first treated to remove oil or other liquid material contained therein. This may be accomplished by extracting the core with a suitable solvent such as acetone, benzene, toluene, etc., and the extraction may be carried out in a Soxhlet extractor or other suitable type of apparatus. Following extraction, the core is thoroughly dried of all solvent, as, for example, by heating in a drying oven at about 100° C.

The impervious coating hereinabove mentioned will be applied to the longer edges of the core. A suitable coating material is a plastic composition such as Lucite, Bakelite, or polystyrene. The coating of the core may be accomplished by covering the entire body of the core with the coating composition in a suitable type of mold press, such as a metallurgical press. Thereafter, the two base ends are cut to remove the coating and expose the base surfaces of the core. Preferably, the base ends are cut below the surfaces of the core in order to insure that the exposed surfaces will be completely free of any absorbed coating material. The coated core should be of suitable diameter or width to be accommodated in the pressure measuring device, as will hereinafter become apparent.

In carrying out the measurement for interstitial water, the dried core, with the impervious coating on its longer edges, is weighed. The core is then saturated with water. To insure practically complete saturation, it is preferred to first remove the air from the core. This may be done by subjecting the core to a reduced pressure in a suitable type of evacuator and then saturating the core at a higher pressure with an inert water-soluble gas such as carbon dioxide. This procedure of evacuating followed by saturating with an inert water-soluble gas may be repeated as often as necessary to insure the removal and replacement of the maximum amount of air practically attainable. Usually, three cycles will be satisfactory. The gas saturated core is evacuated once again and, while under the reduced pressure, water is admitted to it. The water-soluble gas remaining in the core dissolves in the water thereby effecting a satisfactorily complete saturation.

Adherent external water is wiped from the core and the saturated core is weighed. The difference between the weight of the dry core and the weight of the saturated core will be the amount of water absorbed. Knowing the density of the water, the pore volume of the core may then be calculated from the expression $$V_p = \frac{W}{d}$$

where $V_p$ is the pore volume, $W$ is the weight of the absorbed water, and $d$ is the density of the water. The pore volume, as determined by this method, will be found occasionally to be less than the pore volume as determined by other methods, such as the Washburn and Bunting or Coberly-Stevens methods. This, however, may be explained on the basis that the material of the core adsorbs, as well as absorbs, water and the weight of the adsorbed water, while included in the total weight of the water taken up by the core, is representative of micro pore volume only and not macro pore volume available for flow of fluids.

While the core has been described above as being saturated with water, aqueous solutions may also be employed as saturating liquids. A more exact determination of the minimum interstitial water content of the core would indicate the use of a liquid having the same physical and chemical properties as the liquid contained in the core in its underground position. Thus, the liquid employed desirably should have the same surface tension, salinity, etc., as the water in the underground formation. These properties may be determined by analysis of the liquid contained in the formation, and a synthetic liquid having these same properties may be readily prepared by those skilled in the art. Accordingly, saline solutions may be employed for saturating the core. However, for all practical purposes, the use of water will give satisfactory approximations. On the other hand, when electrical conductivity of the core is to be measured in conjunction with determination of interstitial water, saline solutions will be employed in order to obtain a measurably high current through the core.

The semi-permeable membrane with which the core is maintained in capillary contact during measurement of interstitial water is saturated with the same liquid employed for saturating the core. The semi-permeable membrane may be saturated by the same procedures described above in connection with the core, i. e., by evacuating and saturating with an inert, water-soluble gas followed by a final evacuation and, while still under reduced pressure, admitting the saturating liquid.

As a semi-permeable membrane for capillary contact of the core, any suitable type of material heretofore employed for this purpose may be used. The essential characteristics of the semi-permeable membrane is a high displacement pressure to one phase when completely saturated with another phase. Such membranes, when saturated with liquid, for example, will be impermeable to the passage of a gas until the pressure of the gas exceeds a minimum value. Suitable materials for the semi-permeable membrane include unglazed porcelain, fire clay, pumice, talc, etc.

For imposing the pressure on the core for measurement of interstitial water content, a second phase, immiscible with the saturating phase, is employed. Gases such as air, nitrogen, oxygen, light hydrocarbons, etc., are suitable. Preferably, gases having small solubility in the saturating liquid are employed. Liquids may also be employed.

The minimum interstitial water content or some intermediate interstitial water content of the core may be determined. The minimum interstitial water content as measured will be the water content of the core at the point where further increase in the pressure imposed on the core no longer results in removal of water from the core. An intermediate interstitial water content will be the equilibrium water content of the core at the particular pressure imposed but where further increase in the pressure will result in further removal of water from the core. The pressures employed may be as high as desired but a limiting factor will be imposed by the displacement pressure of the semi-permeable membrane, i. e., the pressure at which the membrane saturated with one phase such as liquid will become permeable to another phase such as gas. Pressures employed will be moderate and may be, for example, 5, 10, or 15 pounds per square inch gauge.

The interstitial water content may be expressed as the percentage of the total pore volume occupied by the interstitial water. Knowing the volume of water removed under the influence of the pressure and the volume of water in the core at saturation, the amount remaining may be obtained by subtraction. From this figure, knowing the density of the water, the pore volume occupied by the water may be calculated in the same manner as explained hereinabove for calculation of the total pore volume. The ratio of the pore volume occupied by the interstitial water to the total pore volume multiplied by 100 will give the desired figure. The same figure may be obtained from the ratio of the volume of water retained in the core to the volume at saturation multiplied by 100.

The permeability of the core may be measured at the minimum interstitial water content, or at an intermediate water content, by breaking the capillary contact of the semi-permeable membrane with the exposed surface of the core and measuring the rate of flow of a fluid under a known pressure between the two exposed surfaces of the core. The fluid employed will be immiscible with the liquid employed for saturating the core. Preferably, the fluid is the same as is employed for imposing pressure during measurement of interstitial water and is saturated with the same liquid employed for saturating the core in order to prevent removal of water from the core during measurement of permeability. If the measurement of permeability is made at an intermediate interstitial water content, determination of another intermediate interstitial water content or the minimum interstitial water content may be carried out after conclusion of the permeability measurement by re-contacting the semi-permeable membrane with the exposed surface of the core and re-imposing the desired pressure.

Figure 3:
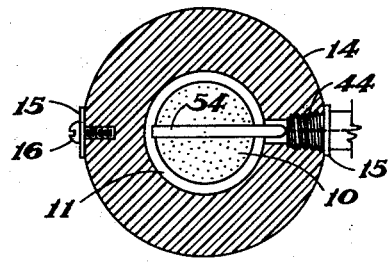
Figure 1:
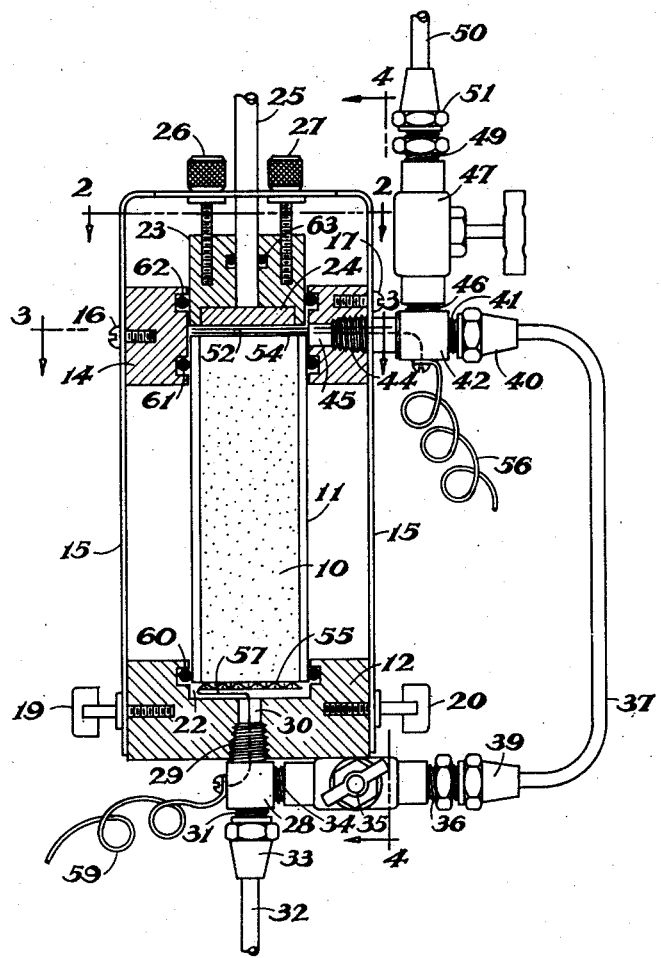
Figure 4:
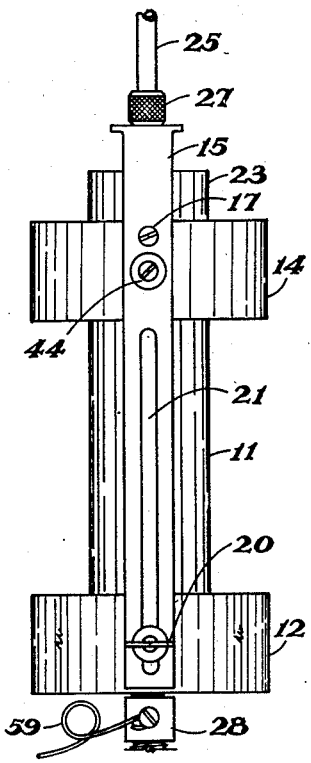
Figure 5:
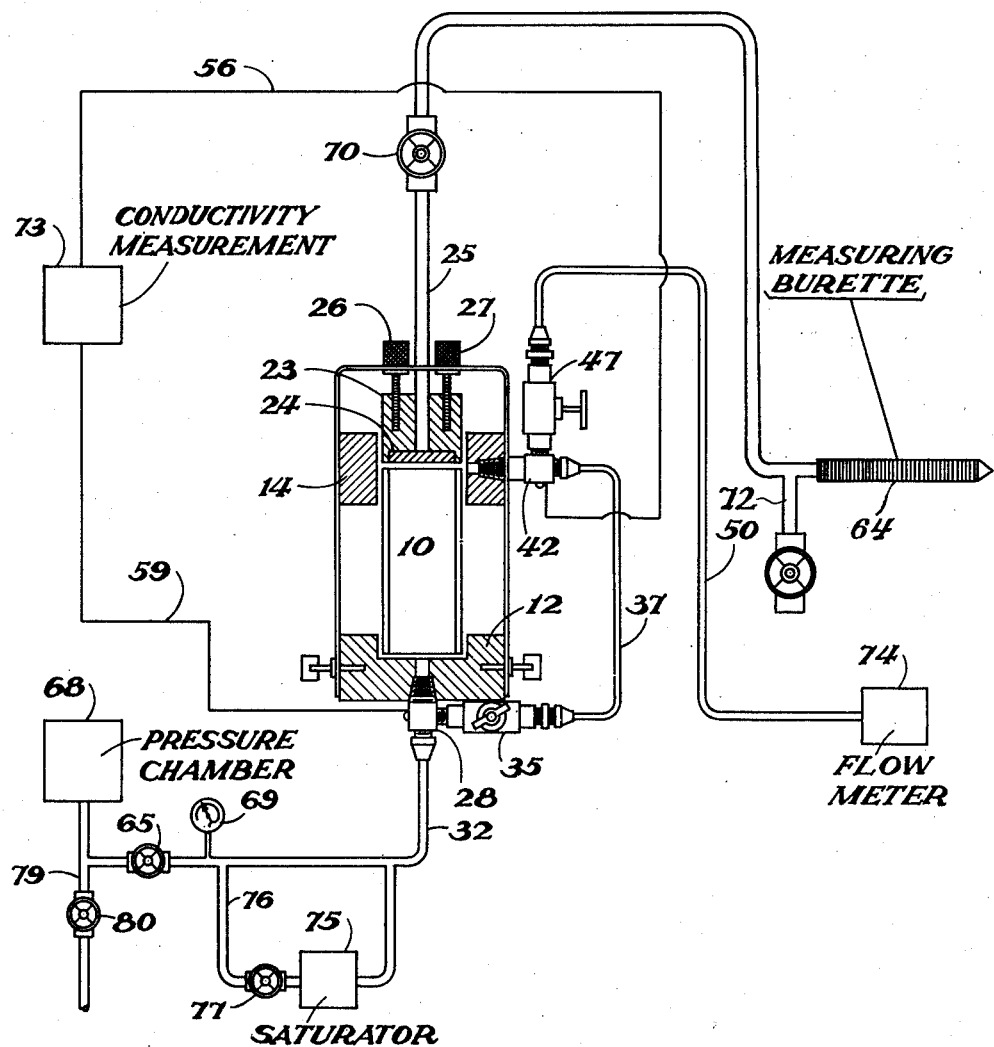

Fig. 1 is a sectional view of apparatus embodying the invention, Fig. 2 is a transverse cross section across the line 2—2 of Fig. 1, Fig. 3 is a transverse section across the line 3—3 of Fig. 1, Fig. 4 is a sectional view across the line 4—4 of Fig. 1, and Fig. 5 is a schematic diagram of the apparatus of Fig. 1 in use.

Referring now to Fig. 1, core 10 covered along its outer edge with impervious coating 11 is supported between end members 12 and 14 which in turn are supported in position by means of U-shaped strap 15. End member 14 is held in position on the strap 15 by means of bolts 16 and 17 while end member 12 is held in position on the strap 15 by means of wing bolts 19 and 20. As shown in Fig. 4, strap 15 is provided with slot 21 through which wing bolt 20 fits. A similar slot (not shown) is provided at the other end of strap 15 through which wing bolt 19 fits. End member 12 is provided with the wing bolts and may be moved vertically on the strap 15 in order to accommodate cores of varying lengths and to conveniently fit the core into position between the base members.

The end members 12 and 14 may be constructed of glass, plastic, or a suitable metal. End member 12 comprises an annulus and contains a cylindrical recess 22 adapted to receive the lower portion of core 10. End member 14 consists of another annulus, the opening of which is adapted to receive the upper portion of the core 10. To place the core in position, as shown in Fig. 1, wing bolts 19 and 20 are loosened and end member 12 is lowered sufficiently to the bottom portion of strap 15. The upper portion of the core is placed within the central opening of end member 14 and the end member 12 is moved upwardly on the strap to receive the lower end of the core. The wing bolts 19 and 20 are then tightened to hold the end member 12 in position.

Plug member 23 fits into the central opening of end member 14 and rests adjacent to the top surface of the core 10. Plug member 23 comprises an annulus, as shown in Fig. 2, and may be constructed of glass, plastic, or a suitable metal. Semi-permeable membrane 24 is fitted in fluid tight relationship into the lower portion of plug member 23 and the center portion of the semi-permeable membrane is open on its upper face to pipe 25. Pipe 25 may be constructed of glass, plastic, or a suitable metal. Tightening screws 26 and 27 are mounted on strap 15 and screw into plug member 23. By operation of these tightening screws, plug member 23 may be pressed tightly against core 10 to insure capillary contact of the semi-permeable membrane 24 with the upper surface of the core.

Fitting 28 is provided at the lower portion of end member 12 and nipple 29 is open to channel 30 leading to the lower surface of core 10. The fitting 28 is provided with nipple 31 which is connected to pipe 32 by means of flare nut 33. Through pipe 32 is provided pressure on the core for measurement of its interstitial water content and fluid for measurement of its permeability. The fitting 28 is also provided with nipple 34 connected to valve 35. The other end of valve 35 contains nipple 36 connected to pipe 37 by means of flare nut 39. The other end of pipe 37 is connected by means of flare nut 40 to nipple 41 on fitting 42 which leads through nipple 44 to channel 45 opening between the upper surface of core 10 and semi-permeable membrane 24. Pipe 37 is made of electrically nonconducting material and preferably should be of flexible material. Tubing made from a plastic such as vinylidene chloride polymer or copolymer with vinyl chloride is satisfactory. Fitting 42 is also provided with nipple 46 connected to valve 47. The other end of valve 47 is provided with nipple 49 connected to pipe 50 by means of flare nut 51.

To insure capillary contact between semi-permeable membrane 24 and the upper exposed surface of core 10, a strip 52 of a porous material such as closely woven cloth or tissue paper is interposed between semi-permeable membrane 24 and core 10, the strip covering the entire surfaces of the core and the semi-permeable membrane.

For measuring the electrical conductivity of the core, electrical contacts or conductors 54 and 55 are provided to contact the top and bottom, respectively, of the core. Contact 54 is preferably electrically conducting metal in the form of a thin narrow strip, as shown in Fig. 3, so as to interfere as little as possible with capillary contact of the top of the core and the semi-permeable membrane. Contact 54 is electrically contacted with nipple 44 on fitting 42 and lead 56 is electrically contacted with fitting 42. Contact 55, as shown, is in the form of a loosely woven wire netting from which a lead 57 contacts the fitting 28. An outer lead 59 also contacts the fitting 28. As hereinabove mentioned, pipe 37 is electrically nonconducting and thus a complete circuit is provided by lead 59, lead 57, contact 55, core 10, contact 54, nipple 44, fitting 42, and lead 56.

To prevent leakage around the lower portion of the core 10, gasket 60 is provided between the core and the inner wall of the recess in base member 12. Gasket 61 is provided for the same purpose between the base member 14 and the upper portion of the core 10. Gasket 62 is provided to prevent leakage between the base member 14 and the plug member 23 and gasket 63 is provided to prevent leakage between the plug member 23 and the pipe 25.

For purposes of clarity of illustration, the upper surface of core 10, the strip of porous material 52, the electrical contact 54, and the lower surface of the semi-permeable membrane 24 fitted into the plug member 23 are shown in Fig. 1 as being slightly separated. However, when measuring the interstitial water content of the core 10, these parts will be in close, tight contact with each other. This is accomplished by means of tightening screws 26 and 27, as hereinabove mentioned.

Referring now to Fig. 5 wherein similar parts in Figs. 1, 2, 3, and 4 have corresponding numbers, for measurement of interstitial water content, the core 10, after leaching and saturating, is positioned between the base members 12 and 14. The plug member 23 containing the semi-permeable membrane 24, which has previously been saturated, is positioned in the base member 14 above the core 10, a film of tissue paper being positioned between the two surfaces as shown in Fig. 1 at 52. Pipe 25 is filled with the same liquid employed for saturating the core 10 and the semi-permeable membrane 24, and is filled at least to the zero mark on measuring burette 64. Measuring burette 64 as shown consists of a graduated glass cylinder open to atmospheric pressure at its further end, although any suitable type of liquid measuring device may be employed. The measuring burette is positioned horizontally and at a level with the top of core 10 to avoid the imposition of a hydrostatic head on the core.

After tightening the end members 12 and 14, the plug member 23, and the bore 10 into position as described above in connection with Fig. 1, valve 65 in pipe 32 is opened to impress upon core 10, for measurement of interstitial water content, the desired pressure from pressure chamber 68. Valve 65 may be employed to control the pressure in pipe 32 and measurement of the pressure in pipe 32 may be made by means of pressure gauge 69. Valve 35 is opened to impress equal pressure at the top and bottom of the core and valve 70 is opened to allow flow of water from the core into pipe 25.

By reason of the pressure on the core 10, water passes from the core through the semi-permeable membrane 24 and thence through pipe 25 to measuring burette 64. The process is slow sometimes requiring a number of days until the interstitial water content of the core comes to equilibrium at the pressure employed. Until equilibrium is established, the volume of water in the measuring burette increases, finally remaining stationary at equilibrium. Where the volume of the measuring burette is not sufficiently great to accommodate the total amount of water expelled from the core, measured amounts of water may be drained from the burette through valved pipe 72. The volume of interstitial water in the core at equilibrium may be calculated by subtracting the increase in the volume of water in the burette, and any water drained from the burette, from the known volume of water in the core at saturation previously determined by weighing.

Electrical conductivity of the core at equilibrium interstitial water content or at saturated water content, or at any content between saturated and equilibrium, may be determined through leads 56 and 59. Leads 56 and 59 are connected to conductivity measuring device 73 which may be any suitable device of conventional type. For example, the conductivity measuring device 73 may comprise in its simplest form a source of current, a voltmeter, and an ammeter whereby the current is passed through the core, the voltage drop across the core is measured by the voltmeter, and the amount of current passing through the core is measured by the ammeter. However, any other suitable type device or system, such as a balanced circuit potentiometer, may be employed. Preferably, alternating current is employed in order to prevent polarization at the conductors. Further, as mentioned before, where conductivity measurements of the core are to be made, a saline solution or other electrically conducting liquid is employed for saturating the core. The conductivity of the core will be the reciprocal of its resistivity which in turn is the resistance of the core in ohms multiplied by its cross sectional area and divided by its length.

For measurement of permeability, valve 35 is closed and valve 47 is opened. Valve 70 is also closed to prevent loss of water from pipe 25 downwardly through the semi-permeable membrane 24. Capillary contact between the semi-permeable membrane 27 and the top of the core 10 is broken by loosening screws 26 and 27 and fluid, such as a gas, from pressure chamber 68 permitted to flow through the core at the desired pressure through channel 45, fitting 42, and thence through pipe 50 to flow meter 74. The pressure may be controlled by valve 65 and measured by gauge 69. To prevent loss of water from the core, the fluid from chamber 68 is saturated in saturator 75 by passing the fluid from pipe 32 through by-pass pipe 76 containing valve 77. The saturator 75 may be of any suitable conventional type. If it is desired to measure the permeability of the core to a fluid other than the fluid employed for imposing pressure during measurement of interstitial water content, this fluid may be passed into pipe 32 through line 79 containing valve 80.

The rate at which the fluid flows through core 10 is measured by the flow meter 74 which may be of a suitable conventional type. The meter may be an orifice meter, a Venturi tube meter, etc.

After measurement of permeability, measurement of interstitial water content may be resumed by adjusting the pressure in pipe 65 to the desired value by means of valve 65, closing valve 47, re-establishing capillary contact of the semi-permeable membrane 24 with the top of the core 10 by tightening the screws 26 and 27, and opening valves 35 and 70.

Having thus described my invention, it is to be understood that such description has been given by way of illustration and example only and not by way of limitation, reference for the latter purpose being had to the appended claims.

I claim:

1. In an apparatus for the measurement of interstitial water content of a well core sample, an annular member containing a recess adapted to receive in fluid-tight relationship one end of a core sample which has been coated on its surface except for two end faces with a fluid-impervious coating, a second annular member adapted to receive in fluid-tight relationship the other end of said core sample, a semi-permeable membrane supported within the annulus of said second annular member one surface of which membrane is exposed for capillary relationship with the exposed face of said core sample, an annular plug member slidably and at least partially received within the annulus in fluid-tight relationship of said second annular member the annulus of said plug member being exposed to the opposite surface of said membrane, rigid support means connected to said annular members for adjustably holding said annular members in spaced relationship, rigid support means connected to said second annular member and said annular plug member for adjustably holding said annular plug member at least partially within the annulus of said second annular member, means for imposing a fluid pressure through the annulus of said first annular member to the exposed face of said core sample, means for imposing the same fluid pressure to the other exposed face of said core sample exposed to the surface of said semi-permeable membrane, and liquid volume measuring means operable at a pressure lower than said fluid pressure connected to the annulus of said plug member.

2. In an apparatus for the measurement of interstitial water content of a well core sample, an annular member containing a recess adapted to receive in fluid-tight relationship one end of a core sample which has been coated on its surface except for two end faces with a fluid-impervious coating, a second annular member adapted to receive in fluid-tight relationship the other end of said core sample, a semi-permeable membrane supported within the annulus of said second annular member one surface of which membrane is exposed for capillary relationship with the exposed face of said core sample, an annular plug member slidably and at least partially received within the annulus in fluid-tight relationship of said second annular member the annulus of said plug member being exposed to the opposite surface of said membrane, rigid support means connected to said annular members for adjustably holding said annular members in spaced relationship, means connected to said rigid support means and said annular plug member for adjustably holding said annular plug member at least partially within the annulus of said second annular member, means for imposing a fluid pressure through the annulus of said first annular member to the exposed face of said core sample, means for imposing the same fluid pressure to the other exposed face of said core sample exposed to the surface of said semi-permeable membrane, and liquid volume measuring means operable at a pressure lower than said fluid pressure connected to the annulus of said plug member.

3. In an apparatus for the measurement of interstitial water content of a well core sample, an annular member containing a recess sufficiently large to receive one end of a core sample which has been coated on its surface except for two end faces with a fluid-impervious coating, gasket means within said recess to contact the side surface of said coated core sample, a second annular member adapted to receive the other end of the said core sample, gasket means within the annulus of said second annular member to contact the side surface of said core sample, an annular plug member slidably and at least partially received within the annulus in fluid-tight relationship of said second annular member, a semi-permeable membrane recessed in said plug member one surface of which membrane is exposed for capillary relationship with the exposed face of said core sample and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for imposing a fluid pressure through the annulus of said first annular member to the exposed face of said core sample, means for imposing the same fluid pressure to the other exposed face of said core sample exposed to the surface of said semi-permeable membrane, and liquid volume measuring means operable at a pressure lower than said fluid pressure connected to the annulus of said plug member.

4. In an apparatus for the measurement of interstitial water content of a well core sample, an annular member containing a recess adapted to receive in fluid-tight relationship one end of a core sample which has been coated on its surface except for two end faces with a fluid-impervious coating, a second annular member adapted to receive in fluid-tight relationship the other end of said core sample, an annular plug member slidably and at least partially received within the annulus in fluid-tight relationship of said second annular member, a semi-permeable membrane recessed in said plug member one surface of which membrane is exposed for capillary relationship with the exposed face of said core sample and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for imposing a fluid pressure through the annulus of said first annular member to the exposed face of said core sample, means for imposing the same fluid pressure to the other exposed face of said core sample exposed to the surface of said semi-permeable membrane, and liquid volume measuring means operable at a pressure lower than said fluid pressure connected to the annulus of said plug member.

5. In an apparatus for the measurement of the interstitial water content of a core sample which has been coated on its surface except for two end faces with a fluid-impervious coating, an annular member containing a recess open to the annulus of said member, a second annular member containing a channel open to the annulus of said second member, an annular plug member slidably and at least partially received in the annulus in fluid-tight relationship of said second annular member, a semi-permeable membrane recessed in said plug member one surface of which membrane is exposed at the face of said plug member and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for connecting the annulus of said first annular member to a source of fluid pressure, means for connecting the channel of said second annular member with a source of fluid pressure, pipe means between said two last named means, and means for connecting the annulus of said plug member to liquid volume measuring means operable at a pressure lower than said source of fluid pressure.

6. In an apparatus for the measurement of characteristics of a well core sample, an annular member containing a recess adapted to receive in fluid-tight relationship one end of a core sample which has been coated on its surface except for two end faces with a fluid-impervious coating, a second annular member adapted to receive in fluid-tight relationship the other end of said core sample, an annular plug member slidably and at least partially received in the annulus in fluid-tight relationship of said second annular member, a semi-permeable membrane recessed in said plug member one surface of which membrane is exposed for capillary relationship with the exposed face of said core sample and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for imposing a fluid pressure through the annulus of said first annular member to the exposed face of said core sample, means for imposing the same fluid pressure to the other exposed face of said core sample exposed to the surface of said semi-permeable membrane, means for discontinuing the pressure imposed by said last named means, liquid volume measuring means operable at a pressure lower than said fluid pressure, and fluid flow rate measuring means connected at the annulus of said second annular member.

7. In an apparatus for the measurement of characteristics of a well core sample which has been coated on its surface except for two end faces with a fluid-impervious coating, an annular member containing a recess open to the annulus of said member, a second annular member containing a channel open to the annulus of said second member, an annular plug member slidably and at least partially received in the annulus in fluid-tight relationship of said second member, a semi-permeable membrane recessed in said plug member one exposed surface of which membrane is exposed to the face of said plug member and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for connecting the annulus of said first annular member with a source of fluid pressure, means for connecting the channel of said second annular member to a source of fluid pressure, pipe means between said two last named means, valve means in said pipe means, means for connecting the annulus of said plug member to liquid volume measuring means operable at a pressure lower than said source of fluid pressure, and means for connecting the channel in said second annular member to fluid flow rate measuring means.

8. In an apparatus for the measurement of characteristics of a well core sample, an annular member containing a recess adapted to receive in fluid-tight relationship one end of a core sample which has been coated on its surface except for two end faces with a fluid-impervious coating, an electrical conductor in said recess adapted to contact a portion only of one face of said core sample, a second annular member adapted to receive in fluid-tight relationship the other end of said core sample, an electrical conductor in the annulus of said second annular member adapted to contact a portion only of the other face of said core sample, an annular plug member slidably and at least partially received in the annulus in fluid-tight relationship of said second annular member, a semi-permeable membrane recessed in said plug member one surface of which membrane is exposed for capillary relationship with the exposed face of said core sample and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, electrical conductivity measuring means between both said electrical conductors, means for imposing a fluid pressure through the annulus of said first annular member to the exposed face of said core sample, means for imposing the same fluid pressure to the other exposed face of said core sample exposed to the surface of said semi-permeable membrane, means for discontinuing the pressure imposed by said last named means, liquid volume measuring means operable at a pressure lower than said fluid pressure connected to the annulus of said plug member, and fluid flow rate measuring means connected at the annulus of said second annular member.

9. In an apparatus for the measurement of characteristics of a well core sample which has been coated on its surface except for two end faces with a fluid-impervious coating, an annular member containing a recess open to the annulus of said member, an electrical conductor in said recess adapted for connection to electrical conductivity measuring means, a second annular member containing a channel open to the annulus of said second member, an electrical conductor extending across a portion only of the annulus of said second annular member and adapted for connection to electrical conductivity measuring means, an annular plug member slidably and at least partially received in the annulus in fluid-tight relationship of said second annular member, a semi-permeable membrane recessed in said plug member one exposed surface of which membrane is exposed at the face of said plug member and another surface of which membrane is exposed to the annulus of said plug member, rigid support means connected to said annular members for adjustably holding said annular members in spaced relationship, rigid support means connected to said second annular member and said annular plug member for adjustably holding said annular plug member at least partially within the annulus of said second annular member, means for connecting the annulus of said first annular member with a source of fluid pressure, means for connecting the channel of said second annular member to a source of fluid pressure, pipe means between said two last named means, valve means in said pipe means, means for connecting the annulus of said plug member to liquid volume measuring means operable at a pressure lower than said fluid pressure, and means for connecting the channel in said second annular member to fluid flow rate measuring means.

PAUL P. REICHERTZ.

REFERENCES CITED

The following references are of record in the file of this patent:

UNITED STATES PATENTS

| Number | Name | Date |
| --- | --- | --- |
| 2,064,651 | Fiene | Dec. 25, 1936 |
| 2,293,488 | Bays | Aug. 18, 1942 |
| 2,330,721 | Leverett | Sept. 28, 1943 |
| 2,345,935 | Hassler | Apr. 4, 1944 |
| 2,437,935 | Brunner et al. | Mar. 16, 1948 |

OTHER REFERENCES

Circular 6141, entitled Information Circular, Department of Commerce-Bureau of Mines, June 1929, pages 3 to 7 including 1 page of drawing following page 4 (6 pages). (Copy in Class 73-153.)